United States Patent
Aguirre

(10) Patent No.: US 10,543,862 B1
(45) Date of Patent: Jan. 28, 2020

(54) LOAD-BEARING ASSEMBLY

(71) Applicant: Filemon Aguirre, Perris, CA (US)

(72) Inventor: Filemon Aguirre, Perris, CA (US)

( * ) Notice: Subject to any disclaimer, the term of this patent is extended or adjusted under 35 U.S.C. 154(b) by 0 days.

(21) Appl. No.: 16/554,481

(22) Filed: Aug. 28, 2019

(51) Int. Cl.
| | | |
|---|---|---|
| *B62B 3/04* | (2006.01) | |
| *B62B 3/02* | (2006.01) | |
| *B62B 5/06* | (2006.01) | |
| *B62B 5/00* | (2006.01) | |

(52) U.S. Cl.
CPC .............. *B62B 3/02* (2013.01); *B62B 3/04* (2013.01); *B62B 5/0033* (2013.01); *B62B 5/06* (2013.01); *B62B 2206/04* (2013.01); *B62B 2301/044* (2013.01)

(58) Field of Classification Search
CPC .......... B62B 3/02; B62B 5/0033; B62B 5/06; B62B 3/04; B62B 2301/044; B62B 2206/04
See application file for complete search history.

(56) References Cited

U.S. PATENT DOCUMENTS

| | | | | |
|---|---|---|---|---|
| 1,300,533 | A | * 4/1919 | Wessinger | .............. A47C 17/80 248/129 |
| 2,003,162 | A | * 5/1935 | Ulmer | ....................... B62B 3/02 280/35 |
| 2,171,068 | A | 8/1939 | Masters | |
| 2,256,314 | A | 9/1941 | Dunham | |
| 2,373,279 | A | 4/1945 | Vogt | |
| 2,421,128 | A | 5/1947 | Pride | |
| 2,446,518 | A | 8/1948 | Arnold et al. | |
| 2,469,547 | A | 5/1949 | Carter | |
| 2,491,824 | A | 12/1949 | McKee | |
| 2,730,373 | A | * 1/1956 | Blevins | ................. B62B 5/0083 280/35 |
| 2,763,491 | A | * 9/1956 | Shafer, Jr. | ............. B62B 5/0083 280/35 |
| 3,331,613 | A | * 7/1967 | Popelka | ................ B62B 5/0083 280/35 |
| 3,603,608 | A | 9/1971 | Mirkpatrick | |
| 3,684,110 | A | 8/1972 | Meyercord | |
| 3,775,783 | A | * 12/1973 | Miller | .................... A47C 19/04 5/201 |
| 3,857,579 | A | 12/1974 | Hoodenpyle | |
| 3,885,687 | A | 5/1975 | Blas | |
| 3,894,753 | A | 7/1975 | Ickes | |
| 3,937,344 | A | 2/1976 | Montgomery | |

(Continued)

*Primary Examiner* — Jacob B Meyer
(74) *Attorney, Agent, or Firm* — Jafari Law Group, Inc.

(57) ABSTRACT

The present invention is generally a load-bearing assembly that may be expanded so as to increase a surface area on which to support different sized loads. The load-bearing assembly may be constructed with multiple T-shaped frames or housings that register with each other forming a unique H-shaped frame design. The two T-shaped housings register with each other in a manner that facilitates the adjustment of the width of the load-bearing assembly. Extensions enclosed within each housing and extendable at terminal ends of each T-shaped housing extend outwardly from their respective terminal ends to adjust a length of the load-bearing assembly. The load-bearing assembly may be constructed of a light, sturdy metal alloy that is lightweight. Applications include moving inventory inside warehouses or moving furniture or appliances from one location to another.

17 Claims, 8 Drawing Sheets

(56) References Cited

U.S. PATENT DOCUMENTS

| | | | |
|---|---|---|---|
| 3,990,653 A | 11/1976 | Marcell | |
| 4,166,638 A * | 9/1979 | De Prado | B62B 5/0083 280/638 |
| 4,174,849 A | 11/1979 | Wetzel | |
| 4,192,541 A | 3/1980 | Ferneau | |
| 4,531,752 A | 7/1985 | Diener | |
| D286,255 S * | 10/1986 | Gage | D7/332 |
| 4,650,197 A | 3/1987 | Norris | |
| 4,746,141 A | 5/1988 | Willis | |
| 4,793,624 A | 12/1988 | Mace | |
| 4,796,909 A * | 1/1989 | Kirkendall | B62B 3/02 180/906 |
| D302,891 S * | 8/1989 | Lardell | D34/23 |
| 4,900,044 A | 2/1990 | Whitley | |
| 4,934,720 A * | 6/1990 | Dobron | B62B 5/0083 108/56.1 |
| 4,987,976 A | 1/1991 | Daugherty | |
| 5,018,930 A * | 5/1991 | Hardin | B62B 5/0083 254/8 R |
| 5,152,542 A | 10/1992 | DeVoe | |
| 5,249,823 A * | 10/1993 | McCoy | B62B 3/02 280/144 |
| 5,280,933 A | 1/1994 | Finneyfrock | |
| 5,299,659 A * | 4/1994 | Imbeault | B66B 9/16 187/244 |
| 5,299,817 A * | 4/1994 | Chang | B62B 5/0083 280/35 |
| 5,465,996 A * | 11/1995 | Wisz | A45C 13/385 280/35 |
| 5,590,757 A | 1/1997 | Walter et al. | |
| 5,599,031 A * | 2/1997 | Hodges | B62B 5/0083 280/35 |
| 5,645,158 A | 7/1997 | Polka et al. | |
| 5,655,734 A | 8/1997 | Dahl | |
| 5,779,252 A * | 7/1998 | Bolton, Jr. | B62B 3/02 280/35 |
| 5,826,670 A * | 10/1998 | Nan | A61G 5/047 180/15 |
| 5,826,893 A * | 10/1998 | Snoeyenbos | B62B 5/0083 280/43 |
| 5,871,219 A | 2/1999 | Elliot | |
| 5,899,650 A | 5/1999 | Collins | |
| D415,868 S * | 10/1999 | Hewitt | D34/23 |
| 5,975,826 A | 11/1999 | Scholder | |
| 6,059,515 A | 5/2000 | Keller et al. | |
| 6,095,533 A * | 8/2000 | Balolia | B60T 1/14 188/19 |
| 6,109,625 A * | 8/2000 | Hewitt | B60B 33/0007 280/43.24 |
| 6,109,644 A * | 8/2000 | Cox | B62B 1/20 280/47.24 |
| 6,149,372 A | 11/2000 | Lee et al. | |
| 6,203,031 B1 * | 3/2001 | Leverington | B62B 5/0083 280/35 |
| 6,224,071 B1 | 5/2001 | Dummer | |
| 6,299,185 B1 | 10/2001 | Lewis | |
| 6,315,319 B1 | 11/2001 | Hanson et al. | |
| 6,357,063 B1 | 3/2002 | Selby | |
| 6,371,496 B1 * | 4/2002 | Balolia | B60T 1/14 188/19 |
| 6,386,560 B2 | 5/2002 | Calender | |
| 6,454,282 B2 | 9/2002 | Sexton et al. | |
| 6,533,532 B1 | 3/2003 | Scmitt | |
| 6,634,658 B2 | 10/2003 | Larouche | |
| 6,637,761 B1 | 10/2003 | Boettcher | |
| 6,749,207 B2 | 6/2004 | Nadeau | |
| 6,783,147 B1 * | 8/2004 | Green, Sr. | B62B 1/20 280/47.26 |
| 6,786,503 B1 * | 9/2004 | Young | B62B 3/008 280/35 |
| 6,880,837 B2 | 4/2005 | Nandram et al. | |
| 6,902,175 B1 | 6/2005 | Clayey | |
| 6,923,457 B2 | 8/2005 | Nogaki | |
| 6,923,468 B1 * | 8/2005 | Barnett | B62B 3/04 280/35 |
| 7,004,482 B1 | 2/2006 | Steffan | |
| 7,077,404 B2 | 7/2006 | Groskreutz | |
| 7,213,820 B2 * | 5/2007 | Drummond | B60B 33/0005 280/47.34 |
| 7,246,986 B2 | 7/2007 | Doeden | |
| 7,325,817 B1 | 2/2008 | Jankowski | |
| 7,503,571 B2 * | 3/2009 | Cromie | B62B 3/10 280/32.6 |
| 7,780,389 B1 | 8/2010 | Young | |
| 7,784,802 B2 | 8/2010 | White | |
| 7,854,435 B2 | 12/2010 | Campbell | |
| 8,167,322 B2 | 5/2012 | Greene | |
| 8,251,379 B2 * | 8/2012 | Watzke | B62B 1/125 280/35 |
| 8,348,287 B1 | 1/2013 | Smith | |
| 8,360,444 B2 | 1/2013 | Colacecchi | |
| 8,360,474 B2 | 1/2013 | Lurie | |
| 8,475,109 B2 | 7/2013 | Torrison | |
| 8,550,476 B1 | 10/2013 | Whinnery | |
| 8,641,061 B1 | 2/2014 | Sims | |
| 8,695,931 B2 * | 4/2014 | Hall | A47J 37/0786 248/188.2 |
| 8,820,756 B2 | 9/2014 | Hronyetz | |
| 8,820,773 B2 | 9/2014 | Ferree, Jr. | |
| 9,187,110 B2 * | 11/2015 | Bar Noy | B62B 3/02 |
| 9,227,644 B1 | 1/2016 | Piscitello et al. | |
| 9,522,763 B2 * | 12/2016 | Roman | B65D 21/0233 |
| 9,694,838 B2 * | 7/2017 | Gullino | B62B 3/001 |
| 9,784,453 B2 * | 10/2017 | Hall | A47J 37/0786 |
| 9,845,125 B1 * | 12/2017 | Liu | B62B 3/00 |
| 10,053,129 B1 * | 8/2018 | Turner, Jr. | B62B 5/0083 |
| 2001/0054806 A1 | 12/2001 | Calender | |
| 2003/0049112 A1 | 3/2003 | Baranowski | |
| 2003/0086776 A1 | 3/2003 | Nandram | |
| 2003/0127834 A1 | 7/2003 | Click | |
| 2003/0190219 A1 | 10/2003 | Young | |
| 2004/0094921 A1 | 5/2004 | Groskreutz | |
| 2004/0183267 A1 | 9/2004 | Tokarev | |
| 2004/0227316 A1 * | 11/2004 | Drummond | B60B 33/0005 280/79.11 |
| 2004/0258509 A1 | 12/2004 | Doeden | |
| 2005/0023782 A1 | 2/2005 | Nogaki | |
| 2006/0097468 A1 * | 5/2006 | Sugrue | B62B 3/10 280/79.11 |
| 2006/0228201 A1 | 10/2006 | Lenceski | |
| 2007/0193904 A1 * | 8/2007 | Cromie | B62B 3/10 206/386 |
| 2009/0026735 A1 * | 1/2009 | Watzke | B62B 1/125 280/652 |
| 2010/0119342 A1 | 5/2010 | Russ | |
| 2011/0020099 A1 | 1/2011 | Hollins et al. | |
| 2012/0032408 A1 | 2/2012 | Greene | |
| 2012/0126085 A1 * | 5/2012 | Johnson | A47C 7/002 248/346.03 |
| 2013/0127138 A1 | 5/2013 | Ferree | |
| 2013/0168933 A1 * | 7/2013 | Watzke | B62B 1/125 280/47.26 |
| 2014/0077477 A1 | 5/2014 | Hronyetz | |
| 2014/0265189 A1 | 9/2014 | Drowanowski | |
| 2015/0166314 A1 | 6/2015 | Xu et al. | |
| 2016/0075362 A1 | 3/2016 | Della Polla | |

* cited by examiner

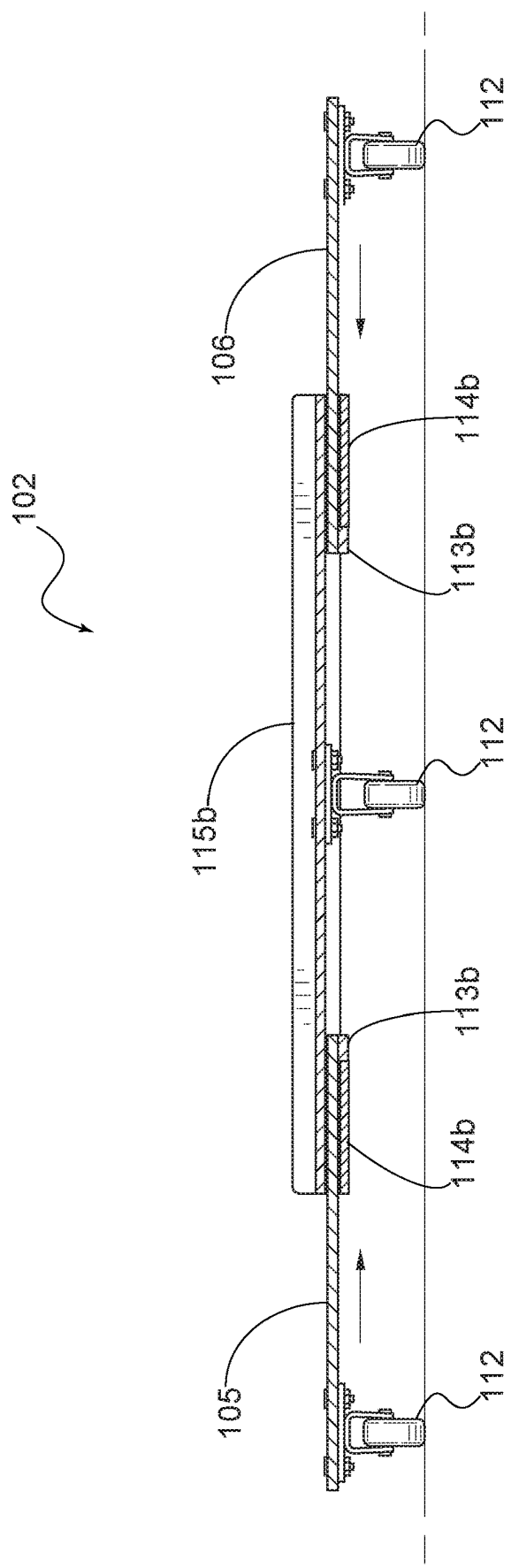

10,543,862 B1

LOAD-BEARING ASSEMBLY

TECHNICAL FIELD OF THE INVENTION

The present invention relates in general to a load-bearing assembly, and more specifically, to a load-bearing assembly for moving heavy or bulky loads, which includes a frame or chassis with expandable supports that adjust to different lengths for accommodating different sized loads; the unique structure of the assembly features a novel versatility and maneuverability unavailable on conventional carts, dollies or hand trucks.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Hand trucks, dollies, or load carts are devices with varying designs generally configured to carry loads from one point to another, and have long been used in a wide variety of settings.

With some designs, the hand truck may be positioned by a user in an upright manner in order to place a load on a frame or platform; the user may then tilt the hand truck at an angle with respect to a surface and push or pull the hand truck to move the load to a desired location. With other designs, a user may place a load on a lateral or planar frame parallel to the ground in order to simply push or pull the hand truck to the desired destination without requiring the user to tilt the device.

A common problem faced by users of prior art designs is the variability of loads a user may encounter during a particular job or task that requires the use of a device such as a hand truck. For example, if moving loads in a warehouse setting, one particular load may be of one size while other loads may be of larger or smaller sizes. Sometimes loads are heavier and require a higher load-bearing support despite the load taking up a relatively small volume, while other times a load may be particularly bulky and thus require a wider or larger support.

The prior art has provided several solutions, but these are inadequate. For example, prior art mechanisms that expand to provide a means for carrying a bulkier load, expand in a manner that still require the user to carry much of the weight—especially expandable designs that are based on had trucks requiring a tilting motion. Other designs that may be suitable for variable load weights are typically clunky, and rather complex. Although some prior art designs include expandable frames, those designs are fairly elaborate and require many moving parts, probably because these are mostly designed for railway transportation or similar industrial applications, which likely make such products unnecessarily expensive and impractical for a regular consumer that is looking to move their furniture, or a warehouse employee setting out to move inventory within the warehouse.

Accordingly, there is an unanticipated need for a load-bearing assembly for moving heavy or bulky loads that includes a frame or chassis with expandable supports that adjust to different lengths for accommodating different sized loads, and which is relatively lightweight, inexpensive, and easily adjustable.

Therefore, there are several problems with the current state of the art, which have not been adequately addressed. The problems persist because a need to provide an efficient, cost-effective load-bearing adjustable assembly has not been adequately met. It is to these ends that the present invention has been developed.

SUMMARY OF THE INVENTION

To minimize the limitations in the prior art, and to minimize other limitations that will be apparent upon reading and understanding the present specification, the present invention describes a load-bearing assembly for moving heavy or bulky loads. A load-bearing assembly in accordance with the present invention includes a frame or chassis with expandable supports that adjust to different lengths for accommodating different sized loads. A unique frame design generally having an H-shape formed by two similar T-shaped frames or housings with T-shaped surfaces that register with each other provides a novel versatility and maneuverability unavailable on conventional carts or hand trucks.

A load-bearing assembly, in accordance with an exemplary embodiment of the present invention, comprises: a first T-shaped frame comprising: a first set of adjacent extensions configured to slidably register inside a first longitudinal channel, each of the first set of extensions situated at respective terminal ends of the first longitudinal channel and configured to adjust a length of the first T-shaped frame; and a second T-shaped frame comprising: a second set of adjacent extensions configured to slidably register inside a second longitudinal channel, each of the second set of extensions situated at respective terminal ends of the second longitudinal channel and configured to adjust a length of the second T-shaped frame; wherein the first set of adjacent extensions are parallel to the second set of adjacent extensions, and a lateral channel of the first T-shaped frame is configured to slidably receive a lateral planar surface of the second T-shaped frame for adjusting the width of the load-bearing assembly.

A load-bearing assembly, in accordance with another exemplary embodiment of the present invention, comprises: an adjustable frame comprising: a first adjustable support member including a first longitudinal planar surface running along a length of the adjustable frame and a first lateral planar surface extending from a middle portion of the first longitudinal planar surface and perpendicular to the first longitudinal planar surface running along a width of the adjustable frame, and a second adjustable support member including a second longitudinal planar surface running along the length of the adjustable frame and a second lateral planar surface extending from a middle portion of the second longitudinal planar surface and perpendicular to the second longitudinal planar surface running along the width of the adjustable frame, wherein the first lateral planar surface of the first adjustable support member is configured to register with the second lateral planar surface of the second adjustable support member; a handle swivably mounted on the first adjustable support member; and a plurality of wheels rotatably coupled to the first and second adjustable support members.

A load-bearing assembly, in accordance with yet another exemplary embodiment of the present invention, comprises: a first T-shaped frame including a handle swivably mounted therein, the first T-shaped frame comprising: a first set of adjacent extensions configured to slidably register inside a first longitudinal channel, each of the first set of extensions situated at respective terminal ends of the first longitudinal channel and configured to adjust a length of the first T-shaped frame, and a first longitudinal planar surface that is perpendicular to a first lateral planar surface extending from a middle portion of the first longitudinal planar surface, the first longitudinal planar surface flush with the first lateral planar surface; a second T-shaped frame comprising: a second set of adjacent extensions configured to slidably register inside a second longitudinal channel, each of the second set of extensions situated at respective terminal ends of the second longitudinal channel and configured to adjust a length of the second T-shaped frame, and a second longitudinal planar surface that is perpendicular to the lateral planar surface of the second T-shaped frame, the lateral planar surface extending from a middle portion of the second longitudinal planar surface, the second longitudinal planar surface flush with the second lateral planar surface; and a plurality of wheels rotatably coupled to the first and second T-shaped frames, wherein the first set of adjacent extensions are parallel to the second set of adjacent extensions, and a lateral channel of the first T-shaped frame is configured to slidably receive a lateral planar surface of the second T-shaped frame for adjusting the width of the load-bearing assembly.

A load-bearing assembly, in accordance with some exemplary embodiments of the present invention, may include: a first planar T-shaped housing, including: a first longitudinal rectangular channel below a first longitudinal planar surface; a first set of adjacent planar extensions that slidably register inside the first longitudinal rectangular channel, each of the first set of adjacent planar extensions situated at respective terminal ends of the first longitudinal rectangular channel and configured to adjust a length of the first longitudinal planar surface; and a first lateral rectangular channel below a first lateral planar surface extending perpendicularly from a middle section of the first longitudinal planar surface to form a first planar T-shaped surface; and a second planar T-shaped housing including: a second longitudinal rectangular channel below a second longitudinal planar surface, the second longitudinal planar surface parallel to the first longitudinal planar surface; a second set of adjacent planar extensions that slidably register inside the second longitudinal rectangular channel, each of the second set of adjacent planar extensions situated at respective terminal ends of the second longitudinal rectangular channel and configured to adjust a length of the second longitudinal planar surface; and a second lateral planar surface extending perpendicularly from a middle section of the second longitudinal planar surface to form a second planar T-shaped surface, wherein the second lateral planar surface slidably registers within the first lateral rectangular channel of the first planar T-shaped housing for adjusting a width of the load-bearing assembly.

A load-bearing assembly, in accordance with some exemplary embodiments of the present invention, may include: a first planar T-shaped housing having a first planar T-shaped surface, including a first a first longitudinal rectangular channel below a first longitudinal planar surface that is positioned perpendicular to a first lateral rectangular channel below a first lateral planar surface extending perpendicularly from a middle section of the first longitudinal planar surface; a second planar T-shaped housing having a second T-shaped surface that slidably registers within a portion of the first planar T-shaped housing, the second planar T-shaped housing including a second longitudinal rectangular channel below a second longitudinal planar surface, and a second lateral planar surface that extends perpendicularly from a middle section of the second longitudinal planar surface, wherein the first longitudinal planar surface is flush with the first lateral planar surface to form the first planar T-shaped surface and the second longitudinal planar surface is flush with the second lateral planar surface to form the second planar T-shaped surface that slidably registers within a portion of the first planar T-shaped housing; a plurality of wheels are rotatably coupled to the first and second T-shaped housings; and a handle swivably mounted on the first longitudinal planar surface of the first T-shaped housing.

A load-bearing assembly, in accordance with some exemplary embodiments of the present invention, may include: a first planar T-shaped housing having a first planar T-shaped surface, including a first a first longitudinal rectangular channel below a first longitudinal planar surface that is positioned perpendicular to a first lateral rectangular channel below a first lateral planar surface extending perpendicularly from a middle section of the first longitudinal planar surface; a second planar T-shaped housing having a second planar T-shaped surface that slidably registers within a portion of the first planar T-shaped housing, the second planar T-shaped housing including a second longitudinal rectangular channel below a second longitudinal planar surface, and a second lateral planar surface that extends perpendicularly from a middle section of the second longitudinal planar surface; and a handle swivably mounted on the first longitudinal planar surface of the first T-shaped housing, wherein: the second longitudinal planar surface is parallel to the first longitudinal planar surface; the second lateral planar surface slidably registers within the first lateral rectangular channel of the first planar T-shaped housing for adjusting a width of the load-bearing assembly; the first longitudinal planar surface is flush with the first lateral planar surface to form the first planar T-shaped surface; the second longitudinal planar surface is flush with the second lateral planar surface to form the second planar T-shaped surface that slidably registers within a portion of the first planar T-shaped housing; and a plurality of wheels are rotatably coupled to the first and second T-shaped housings.

In some exemplary embodiments, a load-bearing assembly that is expandable or adjustable for variable sized loads. In some exemplary embodiments, a load-bearing assembly that is lightweight. In some exemplary embodiments, a load-bearing assembly that is maneuverable. In some exemplary embodiments, a load-bearing assembly is inexpensive to construct. In some exemplary embodiments, a load-bearing assembly includes at least one motorized wheel and controller to facilitate movement of the load-bearing assembly.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

BRIEF DESCRIPTION OF DRAWINGS

Elements in the figures have not necessarily been drawn to scale in order to enhance their clarity and improve understanding of these various elements and embodiments of the present invention. Furthermore, elements that are known to be common and well understood to those in the industry are not depicted in order to provide a clear view of the various embodiments of the invention.

FIG. 4(a) illustrates a front view of a frame or base of a load-bearing assembly in accordance with an exemplary embodiment of the present invention, in an extended configuration.

DESCRIPTION OF THE INVENTION

Figure 1:
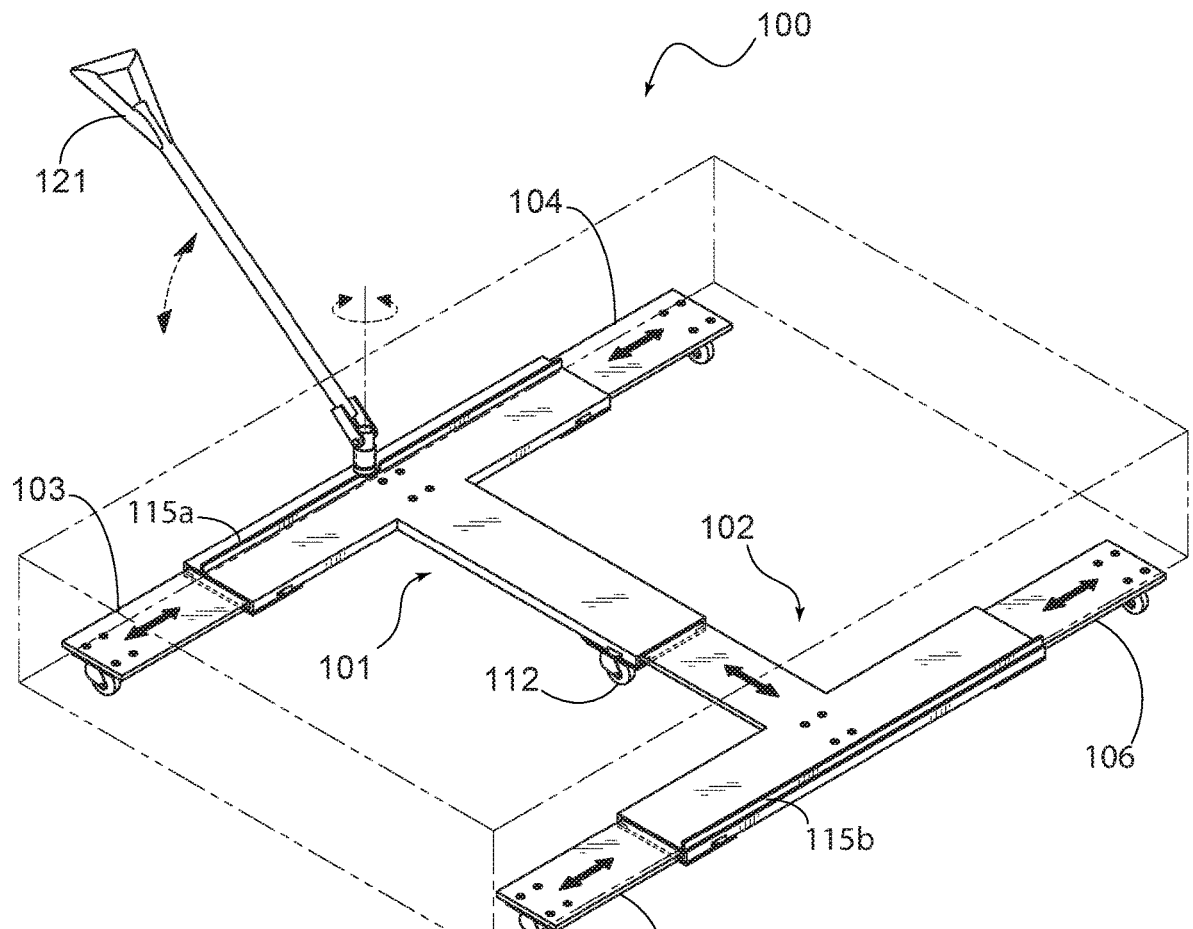
FIG. 1 illustrates a perspective view of a load-bearing assembly in accordance with an exemplary embodiment of the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure.

Generally, the present invention involves a load-bearing assembly that may be expanded so as to increase a surface area on which to support different sized loads. The load-bearing assembly may be constructed with multiple T-shaped frames or housings that register with each other forming a unique H-shape frame design. The two T-shaped frames or housings register with each other in a manner that facilitates the adjustment of the width of the load-bearing assembly. Extensions at terminal ends of each T-shaped housing extend outwardly from their respective terminal ends to adjust a length of the load-bearing assembly. The load-bearing assembly may be constructed of a light, sturdy metal alloy or any other suitable material that is lightweight but strong enough for loads such as large packages, boxes, crates, and or large products such as appliances including but not limited to washers, dryers and the like. Applications include moving inventory inside warehouses or moving furniture or appliances from one location to another.

Turning now to the figures, FIG. 1 illustrates a perspective view of a load-bearing assembly in accordance with an exemplary embodiment of the present invention. More specifically, FIG. 1 depicts load-bearing assembly 100 with reference to several of its components that form an adjustable H-shape frame design made up of two independent T-shaped frames or housings that register with each other, including adjustable housing 101, adjustable housings 102, extensions 103 and 104 (of adjustable housing 101), extensions 105 and 106 (of adjustable housings 102), handle 121, and a plurality of wheels 112 at the base of each frame that allow load-bearing assembly 100 to transport a load from one location to another.

As depicted in FIG. 1 with directional arrows, extensions 103-106 may slidably register with their respective adjustable housings 101 and 102 in order for a user to adjust the length of assembly 100. Similarly, a portion of adjustable housings 102 registers with a portion of adjustable housing 101 in a manner so that a width of assembly 100 may be adjusted.

Each adjustable housing 101 and 102 typically include flat or planar surfaces in order to easily accommodate a load that may be placed on assembly 100. Loads may comprise furniture, appliances—such as dryers and washers—or any other number of items including boxes, pallets containing packages, or the like. Moreover, in exemplary embodiments, as will be discussed further below, a top surface of each adjustable housing 101 and 102 may include thin walls or retention members 115a and 115b vertically extending from the surface of each frame so as to provide support for loads, which may be further reinforced with similar reinforcements such as supports 134 that are perpendicular to the retention member (see FIG. 2). For example, and without limiting the scope of the present invention in any way, a load on assembly 100 may include a washer and dryer that take up the surface area of both frames in an expanded configuration; retention members 115a and 115b may prevent the load from slipping off the surface of assembly 100.

Accordingly, in some exemplary embodiments, load-bearing assembly 100 may comprise a first planar T-shaped housing 101 having a first planar T-shaped surface, including a first a first longitudinal rectangular channel below a first longitudinal planar surface that is positioned perpendicular to a first lateral rectangular channel below a first lateral planar surface extending perpendicularly from a middle section of the first longitudinal planar surface; a second planar T-shaped housing 102 having a second planar T-shaped surface that slidably registers within a portion of the first planar T-shaped housing 101, the second planar T-shaped housing including a second longitudinal rectangular channel below a second longitudinal planar surface, and a second lateral planar surface that extends perpendicularly from a middle section of the second longitudinal planar surface, wherein the first longitudinal planar surface is flush with the first lateral planar surface to form the first planar T-shaped surface and the second longitudinal planar surface is flush with the second lateral planar surface to form the second planar T-shaped surface that slidably registers within a portion of the first planar T-shaped housing 101; a plurality of wheels 112 are rotatably coupled to the first and second T-shaped housings; and a handle 121 swivably mounted on the first longitudinal planar surface of the first T-shaped housing 101.

In exemplary embodiments, as shown, load-bearing assembly 100, further comprises a set of adjacent planar extensions 103 and 104 that slidably register inside a longitudinal rectangular channel of housing 101, each of the set of adjacent planar extensions 103 and 104 situated at respective terminal ends of the first longitudinal rectangular channel and configured to adjust a length of the first longitudinal planar surface of T-shaped housing 101. Similarly, load-bearing assembly 100, may further comprise a set of adjacent planar extensions 105 and 106 that slidably register inside the second longitudinal rectangular channel of T-shaped hosing 102, each of the set of adjacent planar extensions 105 and 106 situated at respective terminal ends of the second longitudinal rectangular channel of the T-shaped housing 102 and configured to adjust a length of the second longitudinal planar surface T-shaped housing 102.

In some exemplary embodiments, as will be discussed further immediately below, load-bearing assembly 100 may include: a motor coupled to at least one of the plurality of wheels rotatably coupled to the first and second T-shaped housings; and a controller coupled to a portion of the handle and in communication with the motor configured to control actuation of the at least one of the plurality of wheels.

Figure 1A:
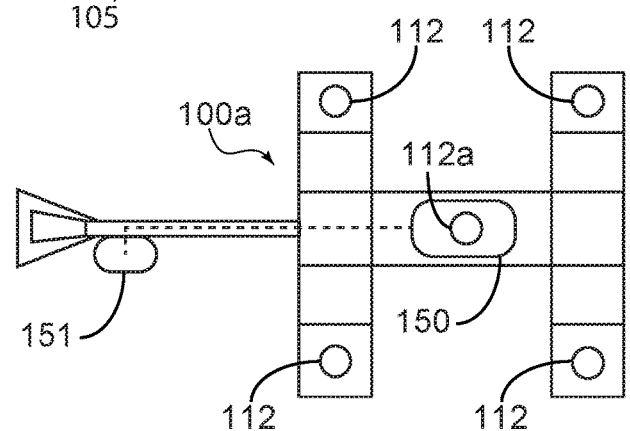
FIG. 1A illustrates a bottom-view diagram of a load-bearing assembly in accordance with an exemplary embodiment of the present invention, which includes a motorized wheel and controller to facilitate movement of the device when loaded with a heavy load.

FIG. 1A illustrates a bottom-view diagram of a load-bearing assembly in accordance with an exemplary embodiment of the present invention, which includes a motorized wheel and controller to facilitate movement of the device when loaded with a heavy load. More specifically, this view depicts load-bearing assembly 100a, which includes a motor 150 coupled to at least one of the plurality of wheels 112a rotatably coupled to one of the T-shaped housings (or a bottom portion thereof, for example a lateral portion such as terminal end 131 of housing 101) and a controller 151 coupled to a portion of the handle 121a and in communication with the motor 150 configured to control actuation of the at least one of the plurality of wheels 112a. This exemplary embodiment would assist an operator by facilitating movement of the load-bearing assembly when a particularly heavy load or any load is placed on its surface.

Figure 2:
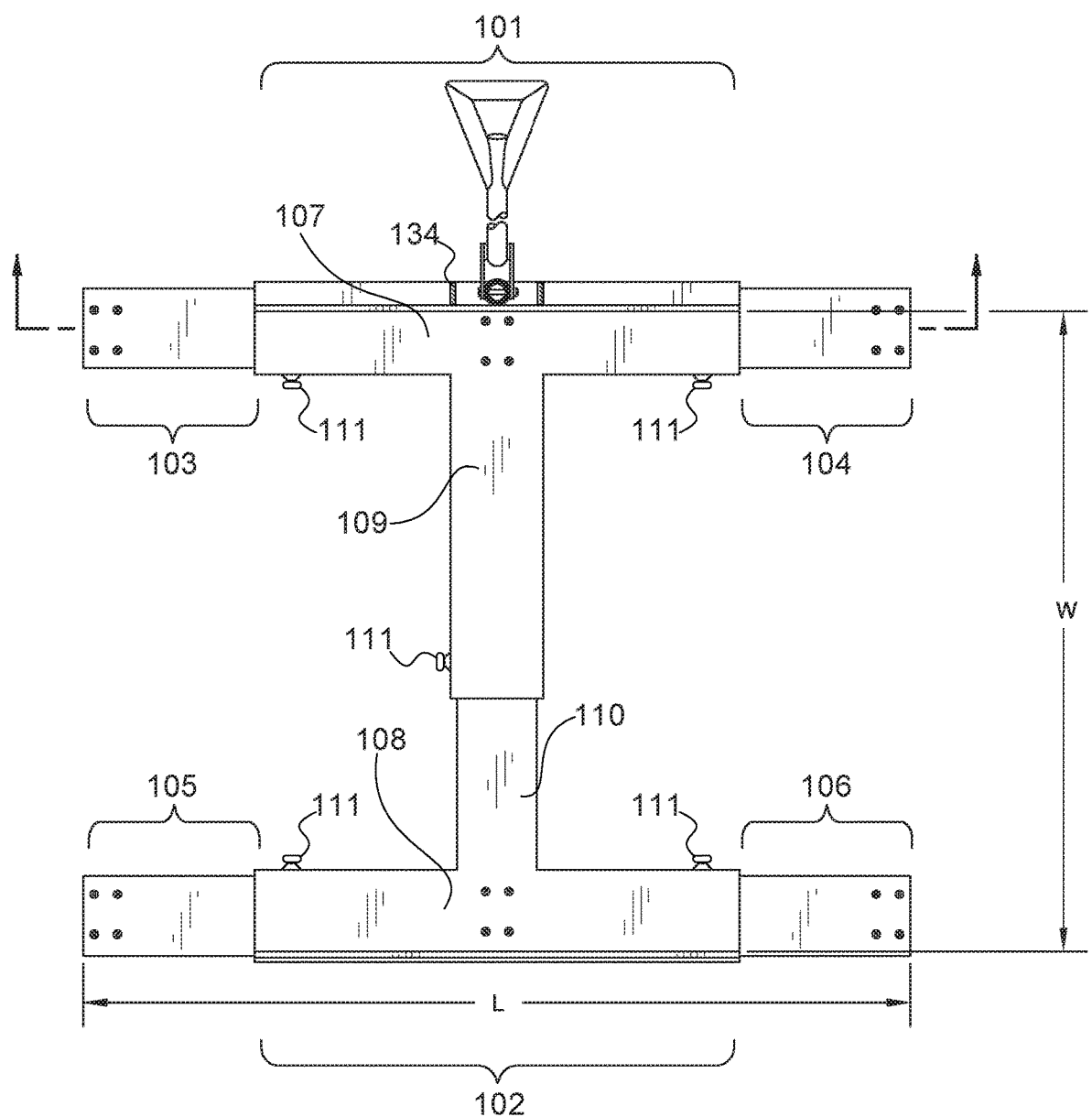
FIG. 2 illustrates a top view of a load-bearing assembly in accordance with an exemplary embodiment of the present invention.

Turning now to the next figure, FIG. 2 illustrates a top view of a load-bearing assembly in accordance with an exemplary embodiment of the present invention. More specifically, FIG. 2 depicts assembly 100 comprising a first adjustable support member or T-shaped housing 101 that is configured to slidably receive a second adjustable support member or T-shaped housings 102; each frame including channels for slidably receiving respective extensions 103-106. From this top view, the various components and adjustability of a length and width of the assembly may be appreciated.

Figure 3:
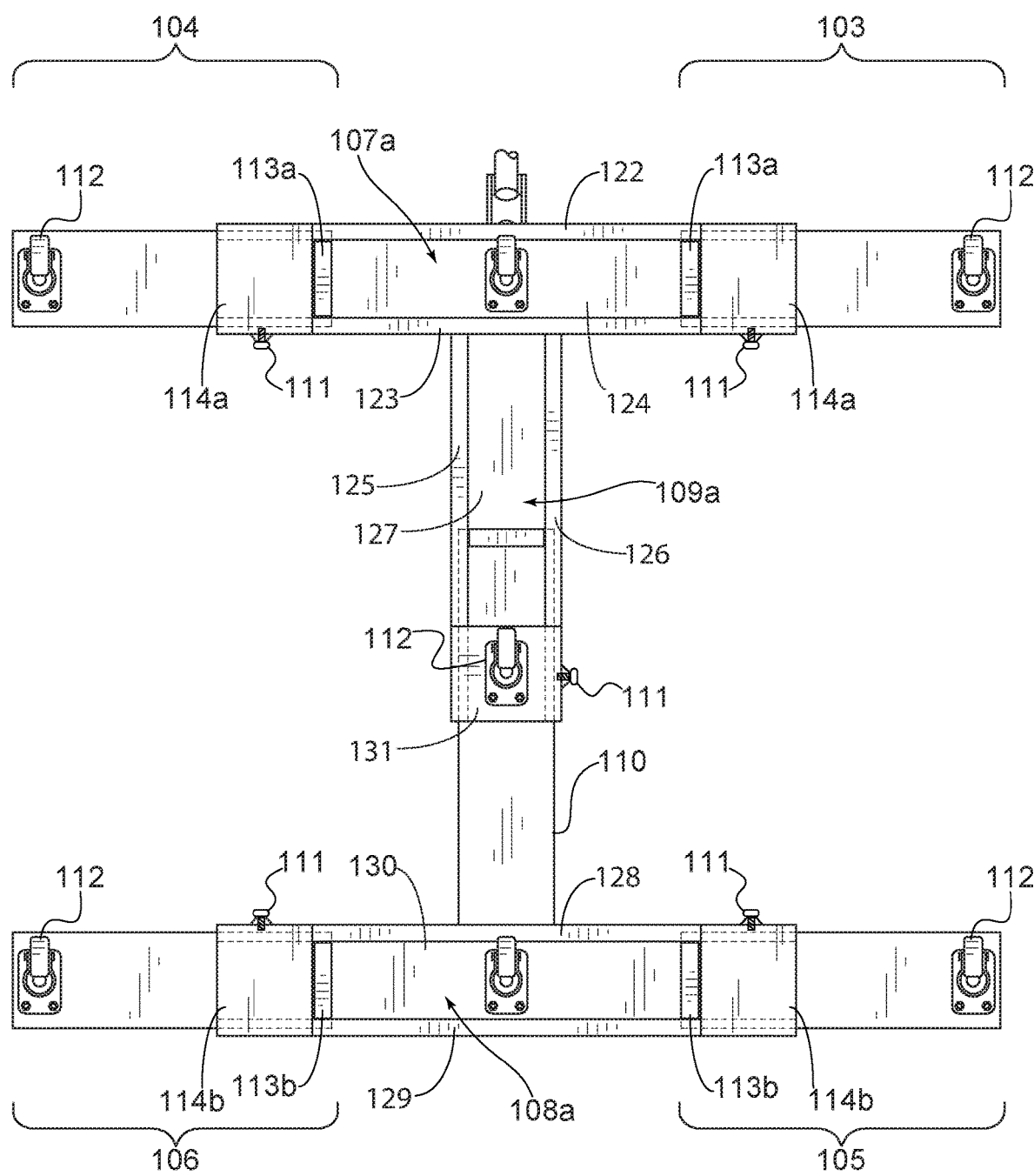
FIG. 3 illustrates a bottom view of a load-bearing assembly in accordance with an exemplary embodiment of the present invention.

Housing 101 is depicted comprising: a set of adjacent extensions 103 and 104, which are each configured to slidably register inside a longitudinal channel 107a (see FIG. 3). Each of the first set of extensions (103 and 104) is situated at respective terminal ends of longitudinal channel 107a and configured to adjust a length L of housing 101.

Housings 102 is depicted comprising another set of adjacent extensions 105 and 106 configured to slidably register inside a longitudinal channel 108a (see FIG. 3) of housings 102, each of the second set of extensions 105 and 106 situated at respective terminal ends of the second longitudinal channel 108a and configured to adjust a length L of housings 102. Housings 101 and 102 may be constructed out of a variety of materials, but is preferably constructed of a light metal that is durable and sturdy enough to support heavy loads such as appliances, furniture, and the like.

Housing 101 and housings 102 are similarly constructed; each housing 101 and 102 includes a longitudinal planar surface (107 and 108, respectively) running along a length of each adjustable frame. Moreover, housing 101 and housings 102 each include a lateral planar surface (109 and 110, respectively) extending from a middle portion of, and perpendicular to, the longitudinal planar surface of each frame. However, because housings 102 is configured to register inside housing 101, their construction differs in various respects as will be detailed below.

In the shown embodiment of FIG. 2, housing 101 includes longitudinal planar surface 107 running along length L of housing 101. Lateral planar surface 109 extends perpendicularly from a middle portion of longitudinal planar surface 107, running along a width W of the adjustable housing 101. Housings 102 similarly includes longitudinal planar surface 108 running parallel to longitudinal planar surface 107 along the length L of the adjustable housings 102. Furthermore, housings 102 also includes a lateral planar surface 110, which extends perpendicularly from a middle portion of the longitudinal planar surface 108 along the width W of the adjustable housings 102 (and width of assembly 100). As may be appreciated from this view, each housing 101 and 102 forms a T-shaped frame with a T-shaped surface. Importantly, unlike housing 101, housings 102 only includes a single channel below planar surface 108. As will be explained further with reference to the next figure, housings 102 is configured to slidably register inside a lateral channel 109a of housing 101, which is situated below lateral planar surface 109. This configuration facilitates the adjusting of the width of the load-bearing assembly 100.

As such, while the longitudinal portions of each frame are similar in construction, the lateral portions differ in that they complement each other so that the two frames may be coupled together or register to form the H-shape frame, which may be appreciated from this top view or the following view illustrated in FIG. 3 below. Lastly from this top view, in some exemplary embodiments as shown in FIG. 2, longitudinal planar surface 107 may be flush with lateral planar surface 109 to form a single flush T-shaped surface of housing 101. Similarly, longitudinal planar surface 108 may be flush with lateral planar surface 110 to form a single flush T-shaped surface of housing 102. In this way, a load may be easily placed on top of each T-shaped housings 101 and 102 (i.e. that form the H-shaped frame), meaning a heavy load such as a large appliance for example, may be slid and or adjusted on the surface of the load-bearing assembly with ease.

Accordingly, in some exemplary embodiments of the present invention, load-bearing assembly 100 may comprise a first planar T-shaped housing 101 having a first planar T-shaped surface (107 and 109 combined), including a first a first longitudinal rectangular channel 107a below a first longitudinal planar surface 107 that is positioned perpendicular to a first lateral rectangular channel 109a below a first lateral planar surface 109 extending perpendicularly from a middle section of the first longitudinal planar surface 107; a second planar T-shaped housing 102 having a second planar T-shaped surface (108 and 110 combined) that slidably registers within a portion of the first planar T-shaped housing 101, the second planar T-shaped housing 102 including a second longitudinal rectangular channel 108a below a second longitudinal planar surface 108, and a second lateral planar surface 110 that extends perpendicularly from a middle section of the second longitudinal planar surface 108; and a handle 121 swivably mounted on the first longitudinal planar surface 107 of the first T-shaped housing 101.

In exemplary embodiments, the second longitudinal planar surface 108 is parallel to the first longitudinal planar surface 107. In exemplary embodiments, the second lateral planar surface 110 slidably registers within the first lateral rectangular channel 109a of the first planar T-shaped housing 101 for adjusting a width W of the load-bearing assembly. In exemplary embodiments, the first longitudinal planar surface 107 is flush with the first lateral planar surface 109 to form the first planar T-shaped surface (107 and 109 combined). In exemplary embodiments, the second longitudinal planar surface 108 is flush with the second lateral planar 110 surface to form the second planar T-shaped surface (108 and 110 combined) that slidably registers within a portion of the first planar T-shaped housing 101. Moreover, in exemplary embodiments generally, a plurality of wheels 112 are rotatably coupled to the first and second T-shaped housings 101 and 102.

Now turning to the next figure, FIG. 3 illustrates a bottom view of a load-bearing assembly in accordance with an exemplary embodiment of the present invention. From this view, channel 107a and channel 108a are visible.

Channel 107a typically resides below longitudinal planar surface 107, and is configured with two terminal ends at the exterior portions of the adjustable support member or housing 101. At a first terminal end, channel 107a receives extension 103, while at the other terminal end, channel 107a receives extension 104. Channel 107a is typically constructed below longitudinal planar surface 107 by implementing parallel track retaining members 122 and 123 on opposite sides of a bottom surface 124 (i.e. underneath longitudinal planar surface 107).

In addition to channel 107a, housing 101 further includes channel 109a, which resides below lateral planar surface 109 of housing 101 running a width of assembly 100 and perpendicular to channel 107a. In the shown embodiment, channel 109a is a separate cavity from channel 107a. Channel 109a is typically constructed below lateral planar surface 109 by implementing parallel track retaining members 125 and 126 on opposite sides of a bottom surface 127 (i.e. underneath lateral planar surface 109). As mentioned above, channel 109a is configured to receive a portion of housings 102, and more specifically—in the shown embodiment—channel 109a is configured to receive or register with lateral surface 110 of housings 102.

Channel 108a may be similar to channel 107a. For example, in the shown embodiment, channel 108a typically resides below longitudinal planar surface 108, and is also configured with two terminal ends at the exterior portions of the adjustable support member or housings 102. At a first terminal end, channel 108a receives a portion of extension 105, while at the other (or second) terminal end, channel 108a receives a portion of extension 106. Channel 108a is typically constructed below the longitudinal planar surface 108 by implementing parallel track retaining members 128 and 129 on opposite sides of a bottom surface 130 (i.e. underneath longitudinal planar surface 108).

Each housing 101 and 102 typically includes a plurality of wheels at several positions. The plurality of wheels 112 help support heavy loads, especially at a junction between housings 101 and 102 (i.e. terminal end 131 of housing 101). Accordingly, in exemplary embodiments, wheels may be placed at terminal ends of extensions 103, 104, 105, and 106 (as shown), as well as below the surface and at a middle portion of both longitudinal planar surface 107 and longitudinal planar surface 108 (i.e. each wheel 112 positioned below or even within channel 107a and 108a respectively). In some exemplary embodiments, a first set of wheels may be coupled to the terminal ends of each of the first set of adjacent planar extensions and a second set of wheels coupled to the terminal ends of each of the second set of adjacent planar extensions. As mentioned above with reference to FIG. 1A, in some exemplary embodiments, a third mid-section wheel 112a may be positioned below a terminal end of the lateral planar surface 109, wherein the third mid-section wheel 112a optionally includes a motor 150 for driving the third mid-section wheel.

As may further be appreciated from this bottom view of FIG. 3, each housing 101 and 102 may further include extension adjusters 111, each situated at terminal ends of each housing 101 and 102 where the extensions (i.e. extensions 103, 104, 105, and 106) and lateral support 110 register with their corresponding housings 101 or 102. Extension adjusters 111 may comprise a simple screw or component that resides on a border of a terminal end, and may be tightened in order to be inserted into and create a desired friction that secures each extension inside their corresponding channel. For example, and without deviating from the scope of the present invention, if lateral support 110 is inserted approximately halfway into channel 109a to adjust the width of assembly 100, then this width may be fixed by tightening extension adjuster 111 so that the screw component of adjustor 111 makes contact against lateral support 110 thereby preventing lateral support 110 from sliding further into channel 10a or sliding out of channel 109a. It should also be noted that although each adjuster 111 is pictured in this embodiment as situated on an outer edge of each housing 101 and 102, in other embodiments, each adjuster 111 may be situated below the surface without limiting the scope of the present invention.

Accordingly, in some exemplary embodiments, load-bearing assembly 100 may include a first planar T-shaped housing 101, comprising a first longitudinal rectangular channel 107a below a first longitudinal planar surface 107; a first set of adjacent planar extensions 103 and 104 that slidably register inside the first longitudinal rectangular channel 107a, each of the first set of adjacent planar extensions 103 and 104 situated at respective terminal ends of the first longitudinal rectangular channel 107a and configured to adjust a length L of the first longitudinal planar surface 107; and a first lateral rectangular channel 109a below a first lateral planar surface 109 extending perpendicularly from a middle section of the first longitudinal planar surface 107 to form a first planar T-shaped surface (107 and 109 combined); and a second planar T-shaped housing 102 including: a second longitudinal rectangular channel 108a below a second longitudinal planar surface 108, the second longitudinal planar surface 108 parallel to the first longitudinal planar surface 107; a second set of adjacent planar extensions 105 and 106 that slidably register inside the second longitudinal rectangular channel 108a, each of the second set of adjacent planar extensions 105 and 106 situated at respective terminal ends of the second longitudinal rectangular channel 108a and configured to adjust a length L of the second longitudinal planar surface 108; and a second lateral planar surface 110 extending perpendicularly from a middle section of the second longitudinal planar surface 108 to form a second planar T-shaped surface (108 and 110 combined), wherein the second lateral planar surface 110 slidably registers within the first lateral rectangular channel 109a of the first planar T-shaped housing 101 for adjusting a width W of the load-bearing assembly.

Figure 4B:
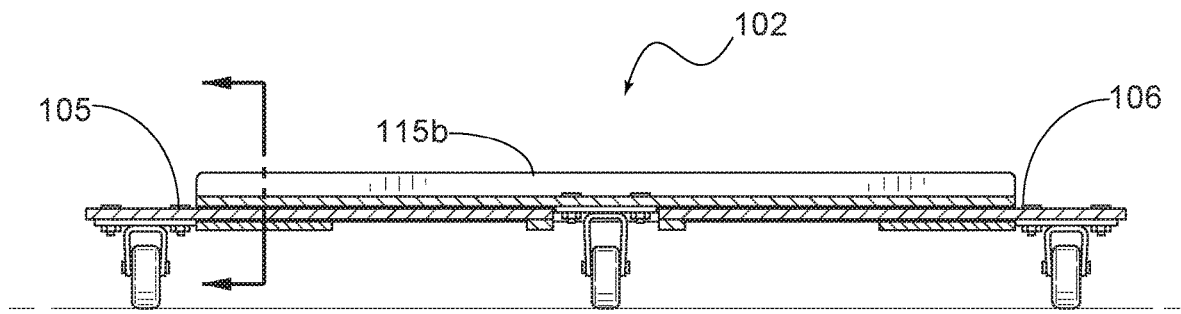
FIG. 4(b) illustrates a front view of a frame or base of a load-bearing assembly in accordance with an exemplary embodiment of the present invention, in a contracted configuration.
Figure 4C:
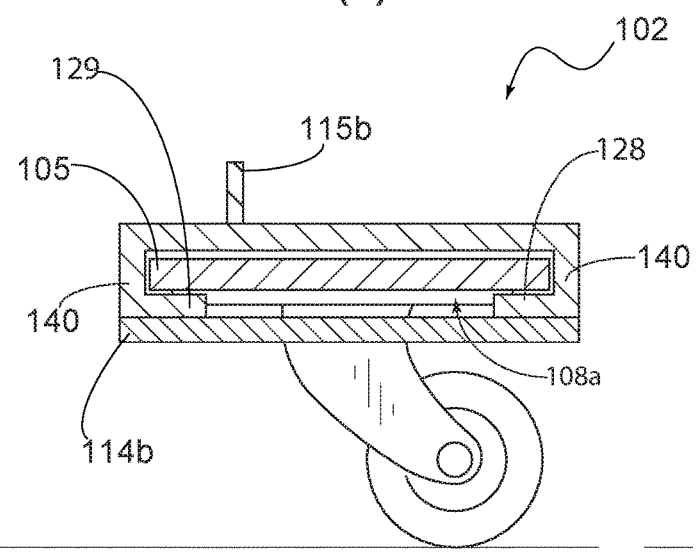
FIG. 4(c) illustrates a cross-sectional view of a portion of the base of a load-bearing assembly in accordance with an exemplary embodiment of the present invention.

Turning now to the next several figures, FIG. 4(a) illustrates a front view of the base of a load-bearing assembly in accordance with an exemplary embodiment of the present invention, in an extended configuration; FIG. 4(b) illustrates a front view of the base in a shortened or contracted configuration; and FIG. 4(c) illustrates a cross-sectional view of a portion of the base. More specifically, FIG. 4(a) depicts a front view of housings 102, showing how each extension 105 and 106 of housings 102 may slide into channel 108a to shorten the assembly 100 for smaller sized loads. In FIG. 4(b), housings 102 of assembly 100 is shown with each extension 105 and 106 slid fully inside channel 108a so that assembly 100 is at its smallest width. From both FIGS. 4(a) and 4(b), retention member 115b is visible. In FIG. 4(c), the function of retention member 115b may further be appreciated as retention member 115b helps to support and maintain a load within longitudinal surface 108 of housings 102. This component prevents, for example, a load from sliding off of assembly 100 either when being placed on a surface of the assembly or when transporting the load from one location to another.

Furthermore, FIG. 4(c) depicts how channel 108a may be configured in an exemplary embodiment. In this view, track retaining members 128 and 129 can be seen extending from border walls 140 of housings 102 into the cavity of channel 108a. Moreover, retaining members 114b help retain extensions 105 and 106 within channel 108a by allowing each extension to slide out until contact is made with retaining member 113b, which extends vertically from a bottom surface of each extension 105 and 106. Similarly, retaining members 114a help retain extensions 103 and 104 within channel 107a by allowing each extension to slide out until contact is made with retaining member 113a, which extends vertically from a bottom surface of each extension 105 and 106.

Figure 5:
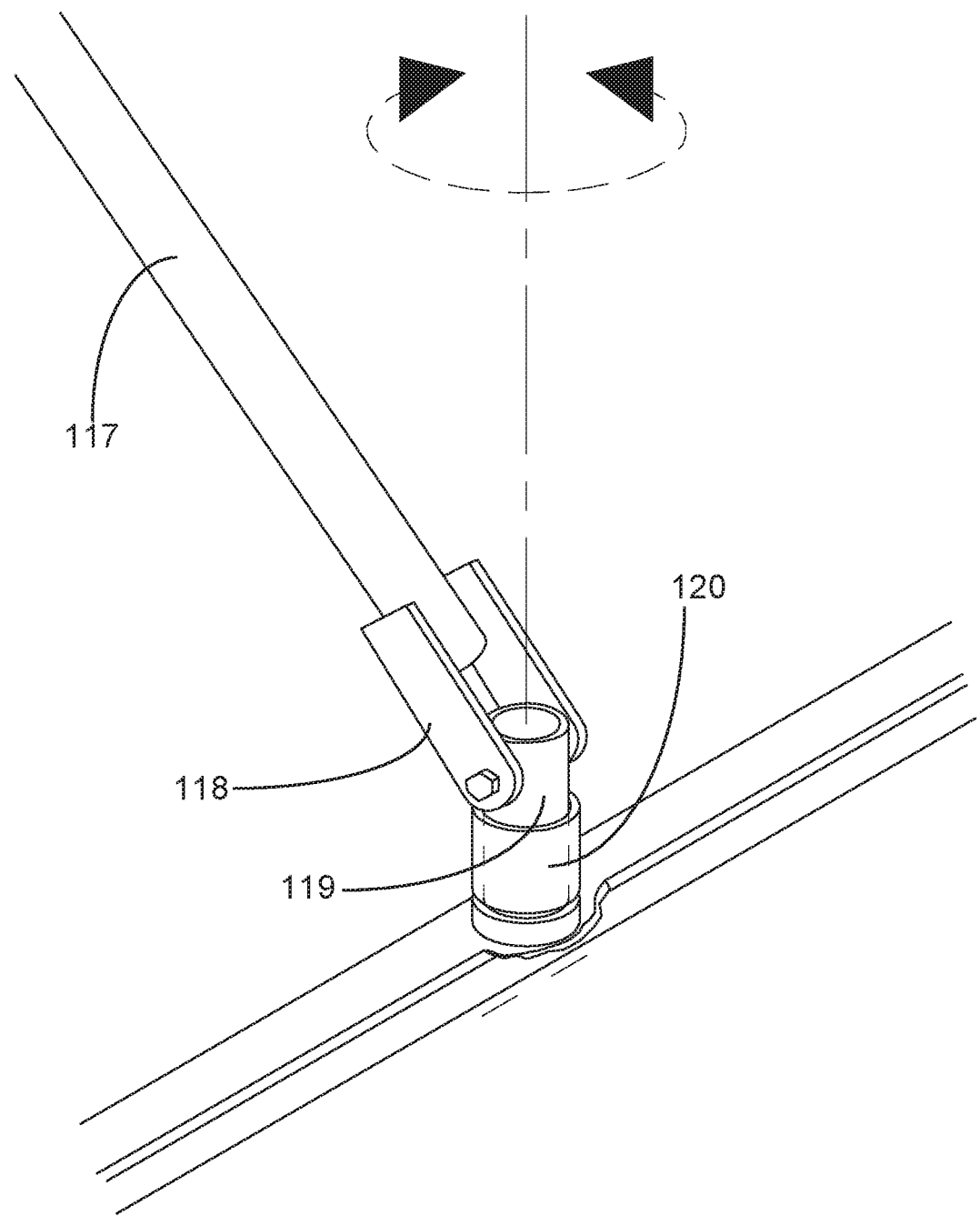
FIG. 5 illustrates a perspective close-up view of a handle for a load-bearing assembly in accordance with an exemplary embodiment of the present invention.

Turning now to FIG. 5, a perspective close-up view of handle 121 shows one exemplary embodiment of a handle for a load-bearing assembly in accordance with the present invention in which the handle is swivably mounted on one of the longitudinal planar surfaces the load-bearing assembly. More specifically, handle 121 comprises an elongated, tubular, member 117 swivably coupled to a retaining member 120 via a receiving member 119, which is directly coupled to the tubular member 117 via supports 118. As a person of ordinary skill in the art will appreciate, handle 121 may comprise the exemplary structure or a variety of other structures for handles common to hand trucks, dollies, and the like. In this exemplary embodiment, the retaining member 120 may be soldered to a component of housing 101 such as retaining member 115a. Receiving member 119 swivably nests inside retaining member 120 so that a rotating motion of tubular member 117 causes handle 121 to swivel or rotate. This type of handle is particularly useful for pulling heavy loads and maneuvering assembly 100.

Figure 6:
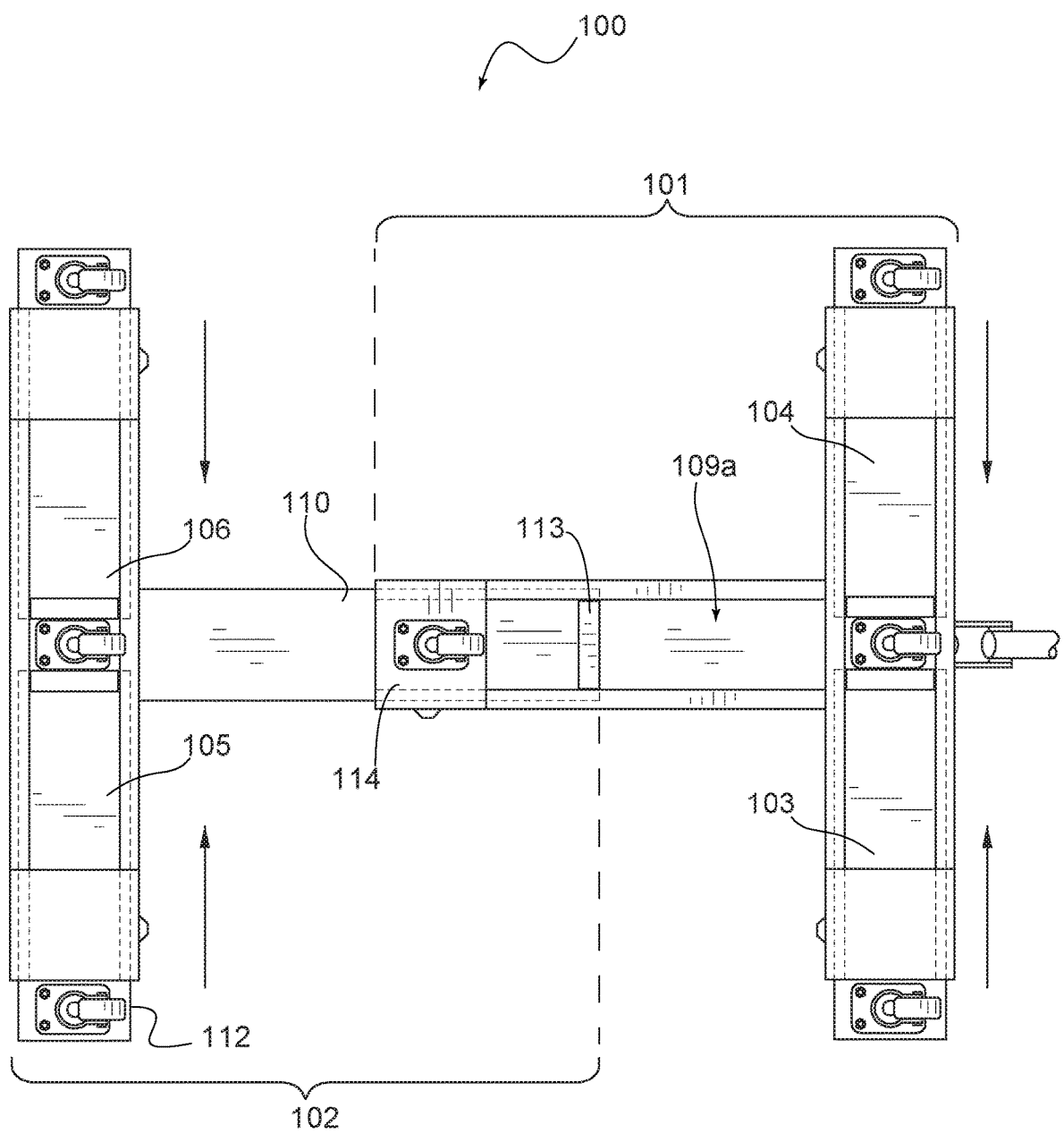
FIG. 6 illustrates a front view of the base of a load-bearing assembly in accordance with an exemplary embodiment of the present invention, the extensions of the base in a contracted configuration while the registering frames or bases remain expanded.
Figure 7:
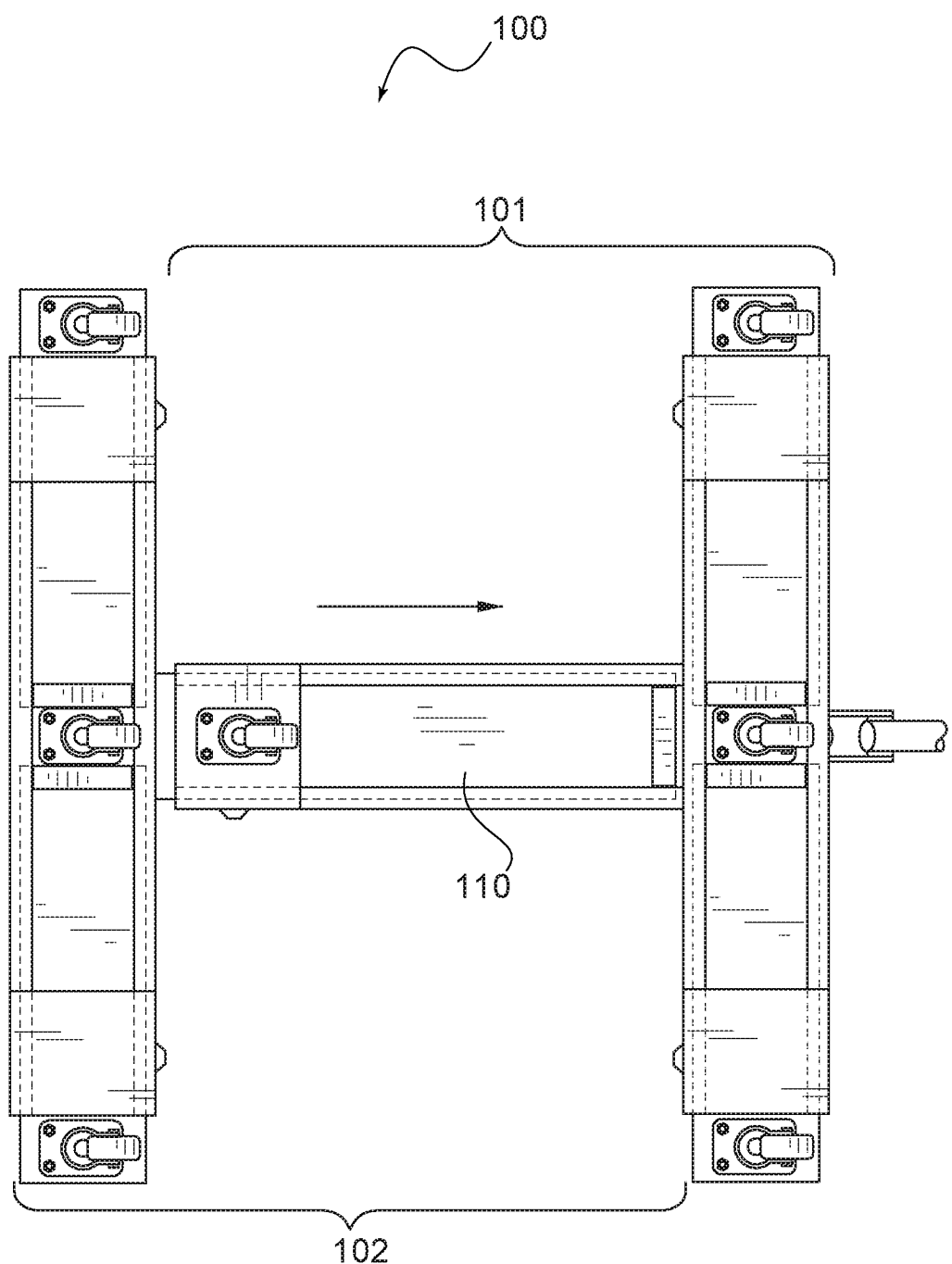
FIG. 7 illustrates a bottom view of the base of a load-bearing assembly in accordance with an exemplary embodiment of the present invention, in a fully contracted configuration.

Turning to the last figures, FIG. 6 illustrates a bottom view of load-bearing assembly 100 with all extensions in a contracted configuration, housings 101 and 102 still expanded; FIG. 7 illustrates a bottom view of load-bearing assembly 100 fully contracted.

A load-bearing assembly has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A load-bearing assembly, comprising:
   a first planar T-shaped housing, including:
      a first longitudinal rectangular channel below a first longitudinal planar surface;
      a first set of adjacent planar extensions that slidably register inside the first longitudinal rectangular channel, each of the first set of adjacent planar extensions situated at respective terminal ends of the first longitudinal rectangular channel and configured to adjust a length of the first planar T-shaped housing; and
      a first lateral rectangular channel below a first lateral planar surface extending perpendicularly from a middle section of the first longitudinal planar surface to form a first planar T-shaped surface; and
   a second planar T-shaped housing including:
      a second longitudinal rectangular channel below a second longitudinal planar surface, the second longitudinal planar surface parallel to the first longitudinal planar surface;
      a second set of adjacent planar extensions that slidably register inside the second longitudinal rectangular channel, each of the second set of adjacent planar extensions situated at respective terminal ends of the second longitudinal rectangular channel and configured to adjust a length of the second planar T-shaped housing;
      a second lateral planar surface extending perpendicularly from a middle section of the second longitudinal planar surface to form a second planar T-shaped surface, wherein the second lateral planar surface slidably registers within the first lateral rectangular channel of the first planar T-shaped housing for adjusting a width of the load-bearing assembly; and
   a plurality of wheels rotatably coupled to the first and second T-shaped housings, wherein the plurality of wheels rotatably coupled to the first and second T-shaped housings comprise:
      a first set of wheels coupled to the terminal ends of each of the first set of adjacent planar extensions;
      a second set of wheels coupled to the terminal ends of each of the second set of adjacent planar extensions; and
      a first mid-section wheel positioned below the middle section of the first longitudinal planar surface.

2. The load-bearing assembly of claim 1, wherein the first longitudinal planar surface is flush with the first lateral planar surface.

3. The load-bearing assembly of claim 1, wherein the second longitudinal planar surface is flush with the second lateral planar surface.

4. The load-bearing assembly of claim 1, further comprising: a handle swivably mounted on the first longitudinal planar surface of the first T-shaped housing.

5. The load-bearing assembly of claim 1, wherein the plurality of wheels rotatably coupled to the first and second T-shaped housings include:

a second mid-section wheel positioned below the middle portion of the second longitudinal planar surface.

6. The load-bearing assembly of claim 5, wherein the plurality of wheels rotatably coupled to the first and second T-shaped housings include:
a third mid-section wheel positioned below a terminal end of the first lateral planar surface, wherein the third mid-section wheel optionally includes a motor for driving the third mid-section wheel.

7. The load-bearing assembly of claim 1, further comprising:
a first retention member extending along the first longitudinal planar surface; and
a second retention member extending along the second longitudinal planar surface to prevent a load from slipping off the assembly.

8. A load-bearing assembly, comprising:
a first planar T-shaped housing having a first planar T-shaped surface, including a first longitudinal rectangular channel below a first longitudinal planar surface that is positioned perpendicular to a first lateral rectangular channel below a first lateral planar surface extending perpendicularly from a middle section of the first longitudinal planar surface;
a second planar T-shaped housing having a second planar T-shaped surface that slidably registers within a portion of the first planar T-shaped housing, the second planar T-shaped housing including a second longitudinal rectangular channel below a second longitudinal planar surface, and a second lateral planar surface that extends perpendicularly from a middle section of the second longitudinal planar surface; and
a handle swivably mounted on the first longitudinal planar surface of the first T-shaped housing, wherein:
the second longitudinal planar surface is parallel to the first longitudinal planar surface;
the second lateral planar surface slidably registers within the first lateral rectangular channel of the first planar T-shaped housing for adjusting a width of the load-bearing assembly;
the first longitudinal planar surface is flush with the first lateral planar surface to form the first planar T-shaped surface;
the second longitudinal planar surface is flush with the second lateral planar surface to form the second planar T-shaped surface that slidably registers within a portion of the first planar T-shaped housing; and
a plurality of wheels are rotatably coupled to the first and second T-shaped housings.

9. The load-bearing assembly of claim 8, further comprising:
a first set of adjacent planar extensions that slidably register inside the first longitudinal rectangular channel, each of the first set of adjacent planar extensions situated at respective terminal ends of the first longitudinal rectangular channel and configured to adjust a length of the first planar T-shaped housing.

10. The load-bearing assembly of claim 9, further comprising:
a second set of adjacent planar extensions that slidably register inside the second longitudinal rectangular channel, each of the second set of adjacent planar extensions situated at respective terminal ends of the second longitudinal rectangular channel and configured to adjust a length of the second planar T-shaped housing.

11. The assembly of claim 10, wherein the plurality of wheels rotatably coupled to the first and second T-shape frames comprise:
a first set of wheels coupled to the terminal ends of each of the first set of adjacent extensions;
a second set of wheels coupled to the terminal ends of each of the second set of adjacent extensions;
a first mid-section wheel positioned at the middle portion of the first longitudinal planar surface;
a second mid-section wheel positioned at the middle portion of the second longitudinal planar surface; and
a third mid-section wheel positioned at a terminal end of the first lateral planar surface.

12. The load-bearing assembly of claim 8, further comprising:
a first retention member extending along the first longitudinal planar surface; and
a second retention member extending along the second longitudinal planar surface to prevent a load from slipping off the assembly to prevent a load from slipping off the assembly.

13. The load-bearing assembly of claim 8, further comprising:
a motor coupled to at least one of the plurality of wheels rotatably coupled to the first and second T-shaped housings; and
a controller coupled to a portion of the handle and in communication with the motor configured to control actuation of the at least one of the plurality of wheels.

14. A load-bearing assembly, comprising:
a first planar T-shaped housing having a first planar T-shaped surface, including a first longitudinal rectangular channel below a first longitudinal planar surface that is positioned perpendicular to a first lateral rectangular channel below a first lateral planar surface extending perpendicularly from a middle section of the first longitudinal planar surface;
a second planar T-shaped housing having a second planar T-shaped surface that slidably registers within a portion of the first planar T-shaped housing, the second planar T-shaped housing including a second longitudinal rectangular channel below a second longitudinal planar surface, and a second lateral planar surface that extends perpendicularly from a middle section of the second longitudinal planar surface, wherein the first longitudinal planar surface is flush with the first lateral planar surface to form the first planar T-shaped surface and the second longitudinal planar surface is flush with the second lateral planar surface to form the second planar T-shaped surface that slidably registers within a portion of the first planar T-shaped housing;
a plurality of wheels are rotatably coupled to the first and second T-shaped housings; and
a handle swivably mounted on the first longitudinal planar surface of the first T-shaped housing.

15. The load-bearing assembly of claim 14, further comprising:
a motor coupled to at least one of the plurality of wheels rotatably coupled to the first and second T-shaped housings; and
a controller coupled to a portion of the handle and in communication with the motor configured to control actuation of the at least one of the plurality of wheels.

16. The load-bearing assembly of claim 14, further comprising:
a first set of adjacent planar extensions that slidably register inside the first longitudinal rectangular channel, each of the first set of adjacent planar extensions situated at respective terminal ends of the first longitudinal rectangular channel and configured to adjust a length of the first planar T-shaped housing.

17. The load-bearing assembly of claim 14, further comprising:
a second set of adjacent planar extensions that slidably register inside the second longitudinal rectangular channel, each of the second set of adjacent planar extensions situated at respective terminal ends of the second longitudinal rectangular channel and configured to adjust a length of the second planar T-shaped housing.

* * * * *